United States Patent [19]

Shinozuka

[11] Patent Number: 5,334,076

[45] Date of Patent: Aug. 2, 1994

[54] RADIO CONTROL CAR

[75] Inventor: Morio Shinozuka, Sawara, Japan

[73] Assignee: Sawara Co., Ltd., Chiba, Japan

[21] Appl. No.: 94,960

[22] Filed: Jul. 22, 1993

[51] Int. Cl.⁵ .................. A63H 30/04; H02J 7/00; H01R 13/00

[52] U.S. Cl. .................. 446/456; 446/462; 446/484; 320/2; 439/700

[58] Field of Search ............ 446/456, 462, 454, 484, 446/439, 434, 429, 430; 320/2; 439/700, 824, 357, 358

[56] References Cited

U.S. PATENT DOCUMENTS

| | | | |
|---|---|---|---|
| 2,832,177 | 4/1958 | Mueller | 446/462 |
| 3,273,038 | 9/1966 | Miller | 446/484 X |
| 4,146,294 | 3/1979 | Kornatowski et al. | 439/700 |
| 4,345,402 | 8/1982 | Hanson et al. | 446/430 |
| 4,563,626 | 1/1986 | Ohtake | 446/462 X |
| 5,052,943 | 10/1991 | Davis | 439/357 |

Primary Examiner—Mickey Yu
Attorney, Agent, or Firm—Shlesinger, Arkwright & Garvey

[57] ABSTRACT

A radio control car allowing the self-running car to be smaller and lighter, requiring less frequent and easier replacement of the battery. The radio control car according to the present invention is characterized in that said radio control car is provided with a self-running car 12 having a power unit 14, a receiving control unit 15 and an accumulating unit 16 for supplying power to the above-mentioned units and with a controller 13 having a transmitting control unit 19 and a battery unit 20, wherein said accumulating unit 16 of said self-running car 12 is charged by said battery unit 20 when a charged terminal 24 of the accumulating unit 16 of the self-running car 12 is connected with a charging terminal 25 of the battery unit 20 of said controller 13.

7 Claims, 5 Drawing Sheets

5,334,076

RADIO CONTROL CAR

BACKGROUND OF THE INVENTION

1. Field of the Invention

The present invention relates to a toy radio control car.

2. Description of the Prior Art

Generally, a radio control car comprises a self-running car which is operated by a radio system and a controller. The self-running car has a power unit including a driving motor and a gear mechanism, etc., a receiving control unit for reception of the radio controller transmissions and controlling the operation of the power unit in correspondence to such signals, and a battery unit for supplying power to the above-mentioned units. Additionally, the controller has a group of operation swiches for making the self-running car move forward, in reverse or steer, a transmitting control unit for sending radio signals in correspondence with each switch and a battery unit for this transmitting control unit.

However, prior radio control cars have the battery unit mounted on the self-running car in such a manner that the following problems are experienced.

The battery unit (a dry cell is used usually) is generally heavy and occupies a relatively large volume. Thus, the power unit for driving the car is made larger which results in the entire car being heavy and large, and it is difficult to obtain a smaller, lighter car. Furthermore, with the larger, heavier self-running car, the power consumption required for running the car is increased so that the battery is consumed rapidly and requires frequent replacement.

Since a battery is required for both the self-running car and the controller, the number of batteries to be used is further increased, wherein the battery life-time depends on the location of its use. While it is necessary to replace the battery depending on the degree of usage, it is difficult for a children or a person having poor electrical knowledge to determine the proper time for doing such. As a result, in some cases the battery is consumed ineffectively or the radio control car is scrapped without merely exchanging the battery.

BRIEF SUMMARY OF THE INVENTION

The present invention is based on the above-mentioned prior problems and it is the objective of the present invention to provide a radio control car that is smaller and lighter, requiring less frequent and easier replacement of the battery than with previous cars.

In order to attain this objective, the radio control car according to the present invention is provided with a self-running car having a power unit, a receiving control unit and an accumulating unit for supplying power to the above-mentioned units, and with a controller having a transmitting control unit and a battery unit, wherein said accumulating unit of said self-running car is charged by said battery unit when a charged terminal of the accumulating unit on the self-running car is connected with a charging terminal of the battery unit on the controller.

Preferably, the charged terminal of the accumulating unit is mounted at the front side of the self-running car in an opened condition and at a predetermined height from the running surface of the self-running car, while the controller is provided with a box-like casing allowing it to be placed on a flat surface and the charging terminal of its battery unit is also mounted at said predetermined height from the bottom of the casing.

A controlled radio wave from the transmitting control unit which is activated by an operator via the controller is received by the receiving control unit of the self-running car, thereby the receiving control unit operates the power unit for making the self-running car run or stop, etc.

Once the electric charge accumlated in the accumlating unit of the self-running car is exhausted, the charged terminal of the accumulating unit is connected to the charging terminal of the battery unit of the controller for charging the accumulating unit. Thus, it is not necessary to mount a heavy battery unit on the self-running car.

Furthermore, when the charged terminal of the self-running car and the charging terminal of the controller are mounted at the same height, the charged terminal can be easily connected with the charging terminal by making the self-running car move towards the controller on the flat surface on which the controller is placed.

DETAILED DESCRIPTION OF THE PREFERRED EMBODIMENT

An embodiment of the present invention will be described in detail in the following with reference to the drawings.

Figure 1:
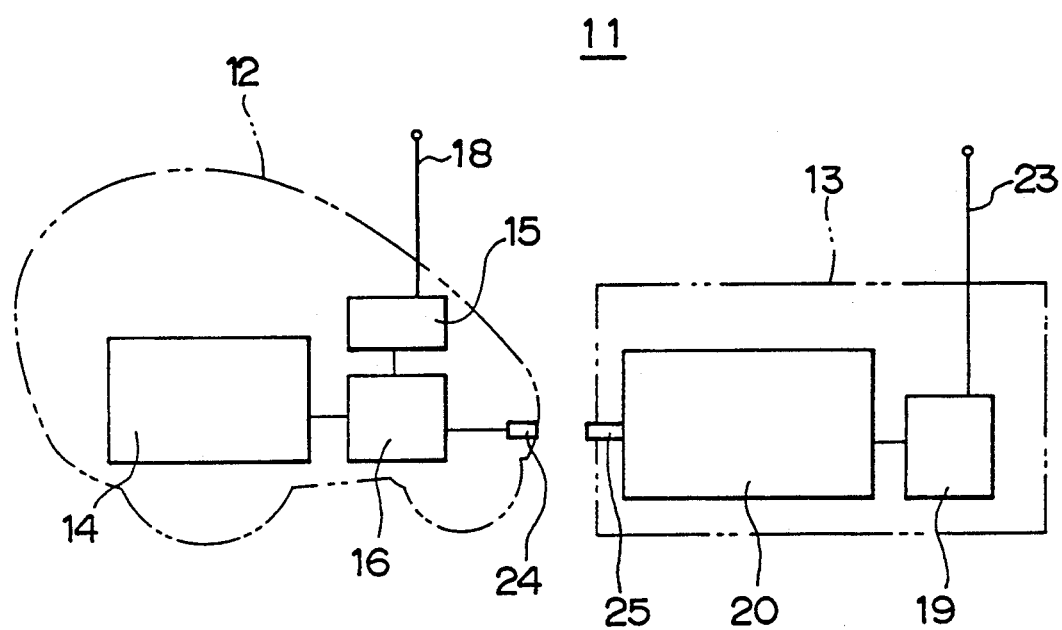
FIG. 1 is a shematic construction view of a rdio control car according to an embodiment of the present invention.
Figure 2:
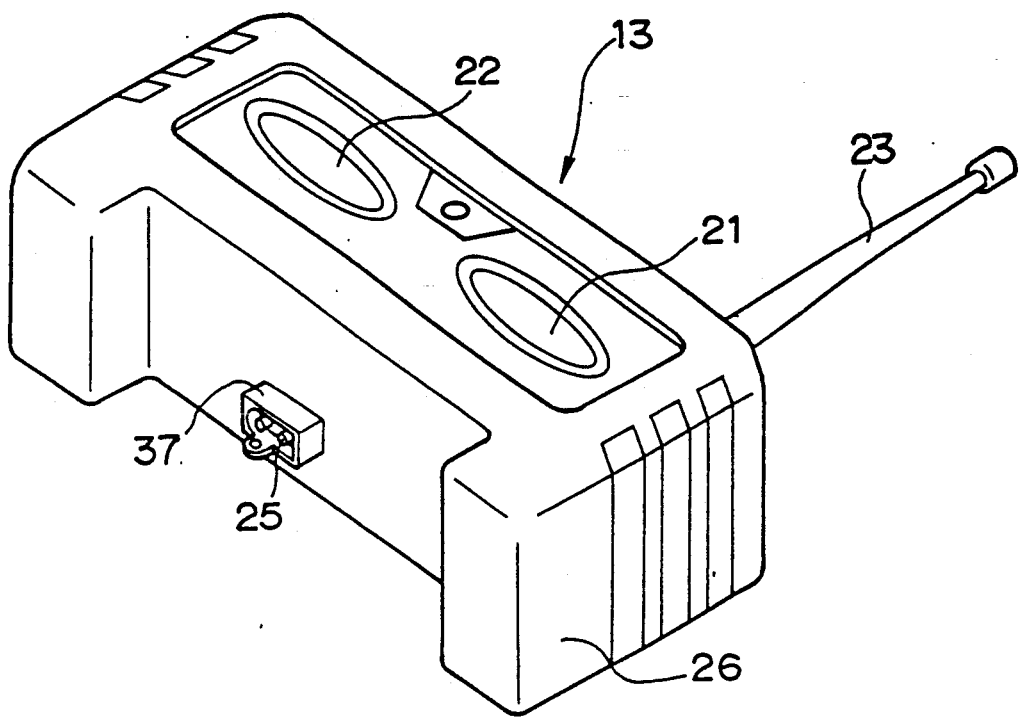
FIG. 2 is a general perspective view of the radio control car in FIG. 1.
Figure 2:
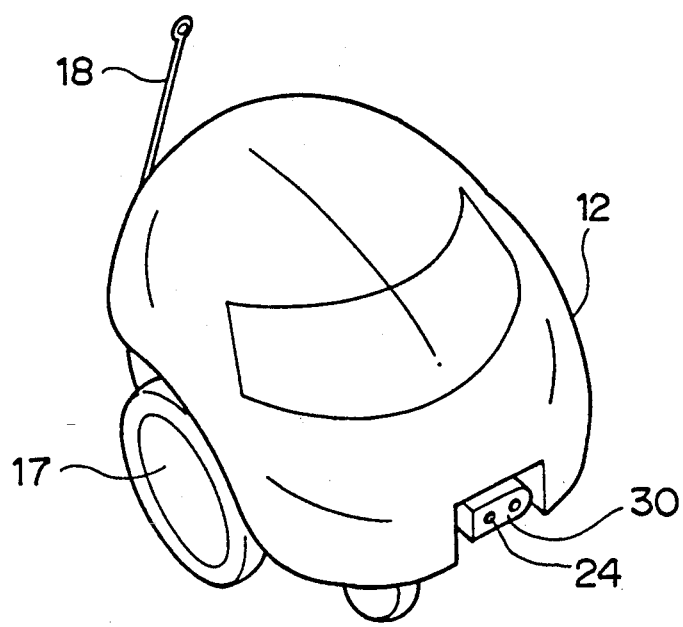

FIG. 1 is a schematic construction view of a radio control car according to an embodiment of the present invention, and FIG. 2 is a general perspective view of he radio control car in FIG. 1.

As shown in FIG. 1 and 2, the present radio control car 11 comprises a self-running car 12 which is controlled by a radio system and a controller 13. The self-running car 12 has a power unit 14, a receiving control unit 15 and an accumulating unit 16 for supplying power to the above-mentioned units. The power unit 14 comprises a gear mechanism connected to the driving wheels 17 of the self-running car 12 and a driving motor for activating them. The receiving control unit 15 has a receiver provided with an antenna 18 for receiving signals of a radio controller which will be described later and a logic circuit for operating the power unit 14 depending on the signal of the radio controller. For example, a light and compact electrolytic capacitor is used for the accumulating unit 16.

The controller 13 has a transmitting control unit 19 and a battery unit 20. As shown in FIG. 2, in the present embodiment, the controller 13 is provided with a forward switch 21 and a spinning switch 22 for changing direction. The transmitting control unit 19 comprises a transmitter having an antenna 23 for transmitting a signal given by these switches 21, 22. The battery unit 20 is a plurality of dry cells exchangeably built-in.

When an operator pushes the forward switch 21 of the controller 13, the left and right driving wheels 17 of the self-running car 12 rotate in the same direction, thereby the self-running car 12 moves forward. When an operator pushes the spinning switch 22 on the other hand, the left and right driving wheels 17 rotate in the reverse direction to each other, thereby the self-running car 12 is capable of changing its running direction by spinning in one place and stopping in an appropriate position. The above-mentioned dynamic control of the self-running car 12 is only for the purpose of description, it can perform either a more complicated or a more simplified dynamic control. An electronic circuit etc. for performing these controls is well-known so a detail description of such a circuit will now be omitted.

The accumulating unit 16 of the self-running car 12 and the battery unit 20 of the controller 13 have a charged terminal 24 and a charging terminal 25, respectively, so that the accumulating unit 16 of the self-running car 12 is charged by the battery unit 20 of the controller 13 when the terminals 24 and 25 are connected.

As shown in FIG. 2, the charged terminal 24 of the accumulating unit 16 is mounted at the front of the self-running car 12 in an opened condition and at a predetermined height from the running surface. While the casing 26 of the controller 13 has a box-type form with a bottom surface which can be placed on a flat surface, the charging terminal 25 of the battery unit 20 is mounted at the same height as the charged terminal 24 on the self-running car 12 in measuring from the bottom surface of the casing 26.

Figure 3:
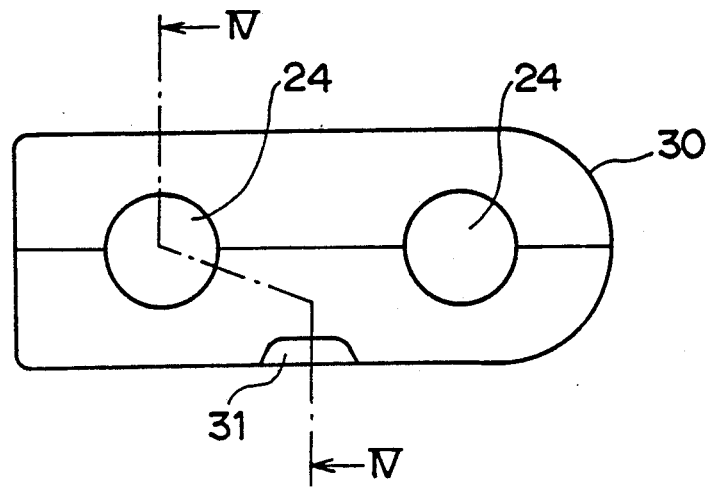
FIG. 3 is a front view of the charged terminal portion of the radio control car in FIG. 1.
Figure 4:
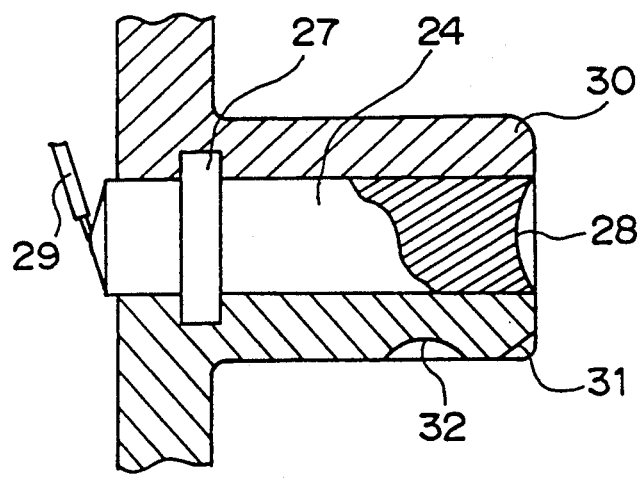
FIG. 4 is a cross-sectional view taken along IV—IV in FIG. 3.

FIG. 3 is a front view of the charged terminal and FIG. 4 is a cross-sectional view taken along IV—IV in FIG. 3. As shown in FIG. 3 and 4, the charged terminal 24 comprises a pair of positive and negative poles made of conductive material having a generally cylindrical form. While the cylinder is provided midway with a projecting flange portion 27 for positioning, and the front end contact surface 28 is shaped concave so as to have a tight contact with the charging terminal 25. A lead wire 29 is mounted on the rear end surface by soldering, wherein the lead wire 29 is connected to the above-mentioned accumulating unit 16.

The charged terminal 24 is held by a half-separable male connector 30 of synthetic resin and is mounted at the front of the self-running car 12 by using this male connector 30. The front shape of the male connector 30 is a symmetrical in the direction of left-and-right, as shown in FIG. 3, in order to prevent an error of pole connection. In addition, as shown in FIG. 4, the male connector 30 is provided with a guide pater surface 31 at the lower corner of the front end as well as a positioning recess 32 in the lower surface.

Figure 5:
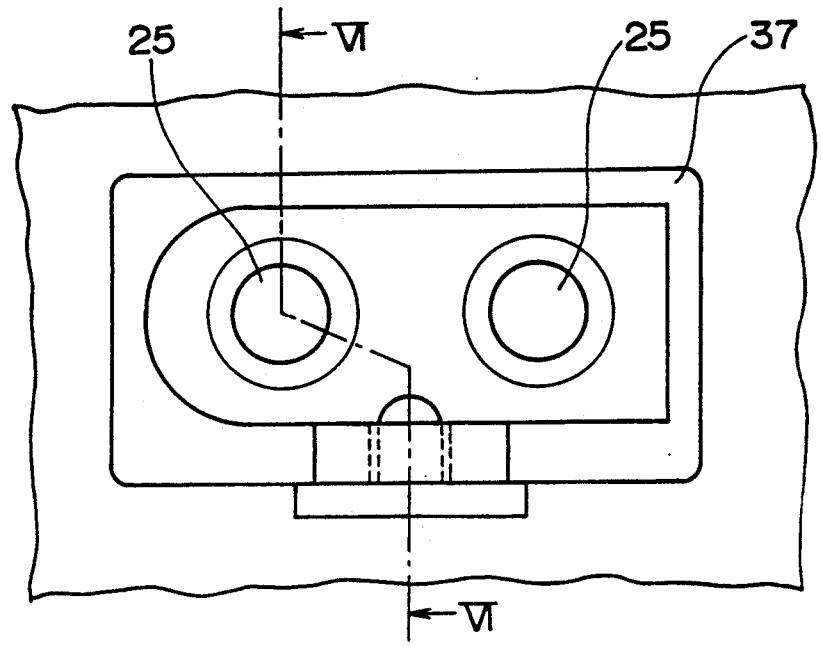
FIG. 5 is a front view of the charging terminal portion of the radio control car in FIG. 1.
Figure 6:
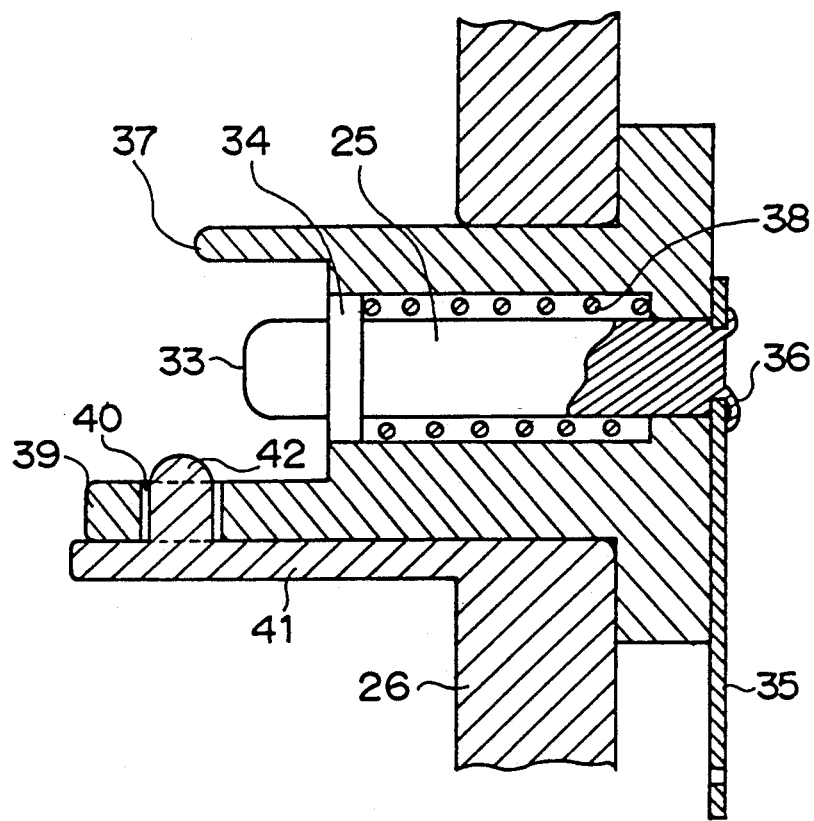
FIG. 6 is a cross-sectional view taken along VI—VI in FIG. 5.

Now, FIG. 5 is a front view of the charged terminal and FIG. 6 is a cross-sectional view taken along VI—VI in FIG. 5. As shown in FIG. 5 and 6, the charging terminal 25 also comprises a pair of positive and nagative poles of conductive material having a generally cylindrical form, which front end contact surface 33 is shaped convex so as to engage with the concave contact surface 28 of the charged terminal 24. The cylinder is provided midway with a projecting flange portion 34 for receiving a spring and a terminal strip 35 is mounted on the rear end surface by a calking 36, wherein the terminal strip 35 is connected to the above-mentioned battery unit 20.

The charging terminal 25 is held slidably in the axial direction by a female connector 37 of synthetic resin and is mounted on the casing 26 of the controller 13 by using this female connector 37. A coil spring 38 is mounted in the inside of the female connector 37 so as to surround the charging terminal 25, wherein the coil spring 38 effects a spring force to the flange portion 34. This applies to the charging terminal a bias force always in the direction of the front end so that in a natural state the position of the charging terminal 25 is held still when the terminal trip 35 abuts to the rear surface of the female connector 37.

The front shape of the female connector 37 is made a symmetrical left-and-right, as shown in FIG. 5, so as to just engage with the male connector 30.

In addition, a projecting portion 39 is formed at the lower side of the female connector 37, wherein said projecting portion 39 is provided with a through-hole 40 and a positioning boss 42 formed at the front end of a projecting spring portion 41 provided in the casing 26 is inserted into said through-hole 40, with the top of the boss 42 slightly projecting from the lower surface of the female connector 37. This positioning boss 42 is adapted to enter into the positioning recess 32 of the male connector 30 when the terminals 24 and 25 are connected by inserting the male connector 30 into the female connector 37.

Figure 7:
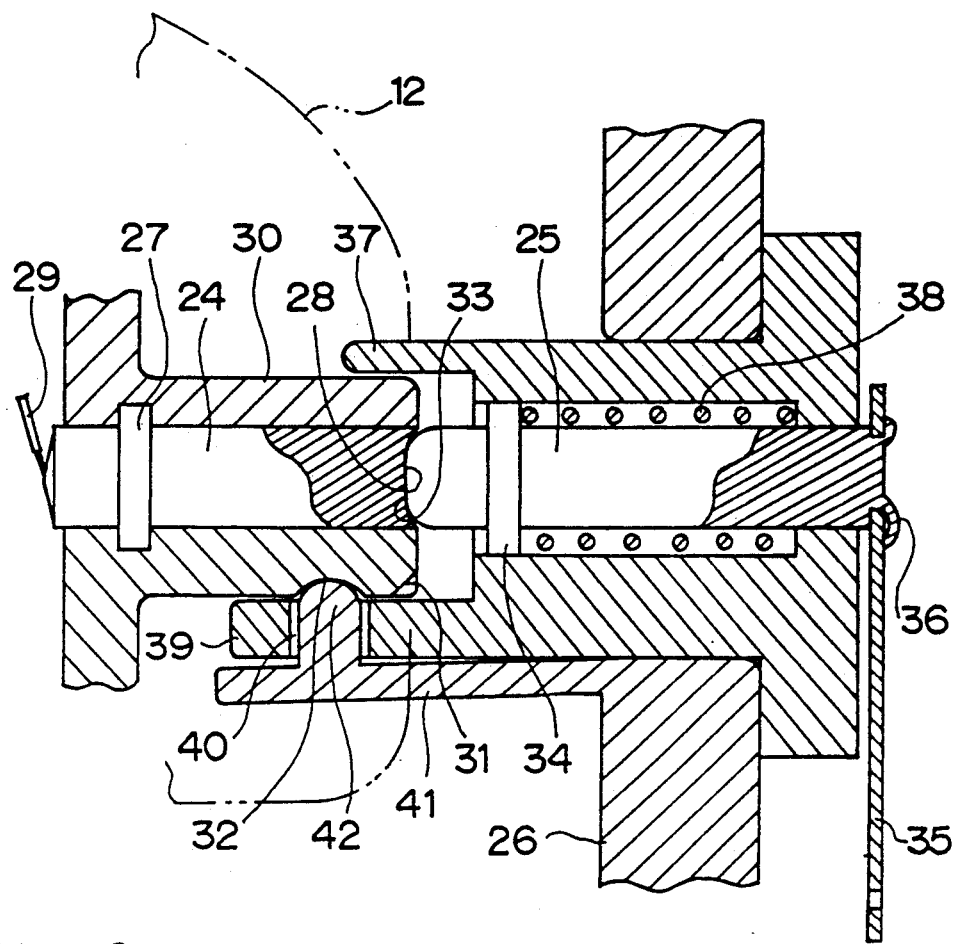
FIG. 7 is a cross-sectional view of the charged terminal and the charging terminal of the radio control car in FIG. 1 when the terminals are connected.

Therefore, according to such a construction, if the charge accumulated in the accumulating unit 16 of the self-running car 12 is exhausted, the accumulating unit 16 of the self-running car 12 is charged by connecting the charged terminal 24 of the accumulating unit 16 with the battery unit 20 of the controller 13. This is shown in FIG. 7 which is a cross-sectional view of the charged terminal 24 and the charging terminal 25 of the radio control car 11 when the terminals are connected. Via such construction the mounting of a heavy battery unit on the self-running car 12 is unnecessary. In the process of connecting the terminals 24 and 25, when the male connector 30 is introduced into the female connector 30, the positioning boss 42 of the female connector 37 abuts at first on a guide taper surface 31 and when the terminals 24 and 25 make a complete contact by further inserting the male connector 37 into the female connector 30 the positioning boss 42 is inserted into the positioning recess 32 of the male connector 30 by the spring force of the spring portion 41 for holding both of connectors 30 and 37. In the state in which a connection is completed as shown in FIG. 7, the charging terminal 25 is retracted somewhat against a spring force of the coil spring 38, thereby both of terminals 24 and 25 being pressed to each other for maintaining a satisfactory contact condition.

Figure 8:
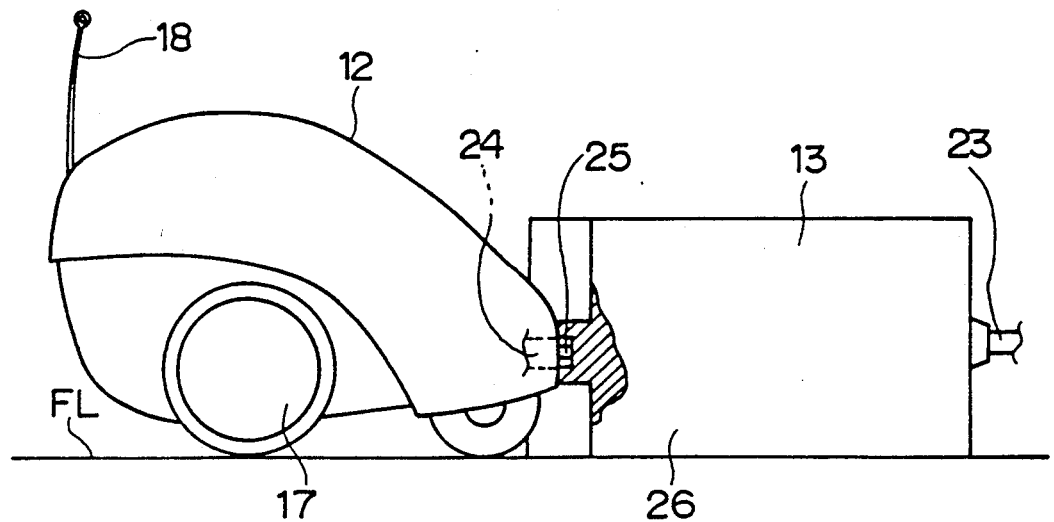
FIG. 8 is a general side view of the radio control .car when the charged terminal and the charging terminal of the radio control car are connected.

Since in this embodiment the charged terminal 25 of the accumulating unit 16 is mounted at a predetermined height from the running surface of the self-running car 12 and the charging terminal 25 of the battery unit 20 is mounted at the same height as the height of the charged terminal 24 in measuring from the bottom of the casing 26, the above-mentioned connection of the charged terminal 24 with the charging terminal 25 can be easily made, as shown in FIG. 8, only by making the self-running car 12 move towards the controller 13 on the flat surface FL on which the controller 13 is placed.

As described in detail with reference to an embodiment, according to the present invention, the accumulating unit of the self-running car is adapted to be charged by the battery unit of the controller when the charged terminal of the accumulating unit of the self-running car is connected with the charging terminal of the battery unit of the controller. Thus it is not necessary to mount a battery on the self-running car, allowing the self-running car to be smaller and lighter and require a reduced number of battery replacements.

Since the charged terminal of the self-running car and the charging terminal of the controller are mounted at the same height, a connection of the charged terminal with the charging terminal is easily made.

What is claimed is:

1. A radio controlled car comprising:
   a) a self-running car including a power unit, a receiving control unit and an accumulating unit for supplying power to said power unit and said control unit;
   b) a remote controller means including a battery unit and a transmitting control unit for transmission of a selected control signal to said self-running car;
   c) said self-running car including a charged terminal positioned at a predetermined height in the front of said self-running car to receive an electric charge and direct the charge to said accumulating unit; and
   d) said controller including a charging terminal adapted to engage said charged terminal and convey an electric charge from said controller to said charged terminal, said charging terminal being positioned on said controller so that when said controller is placed on the ground, said self-running car can be remotely driven by said controller into coupling engagement with said controller thereby allowing an electric charge to be directed from said charging terminal to said charged terminal for recharging of said self-running car.

2. A radio control car as set forth in claim 1 and wherein:
   said controller includes a box-like housing having a bottom surface, a top surface including control means and a generally U-shaped front surface; and
   b) said front surface including said charging terminal.

3. A radio control car comprising:
   a) a self-running car including a power unit, a receiving control unit and an accumulating unit for supplying power to said power unit and said control unit;
   b) a remote controller means including a battery unit and a transmitting control unit for transmission of a selected control signal to said self-running car;
   c) said self-running car including a charged terminal positioned at a predetermined height in the front of said self-running car to receive an electric charge and direct the charge to said accumulating unit;
   d) said controller including a charging terminal adapted to engage said charged terminal and convey an electric charge from said battery unit of said controller to said charged terminal;
   e) said charged terminal housed in a male connector and said charging terminal housed in a female connector, said connectors slidably engageable in an axial direction;
   f) said female connector including spring bias means to urge said charging terminal in an axial direction away from said controller; and
   g) terminal positioning means comprising a resilient boss associated with said female connector and a detent means associated with said male connector so that when said male connector is inserted into said female connector in an axial direction, said detent will engage said boss to position said charged terminal so that said charged terminal will sufficiently contact said spring biased charging terminal and allow an electric charge to be conveyed to said accumulator unit during recharging of said self-running car.

4. A radio control car as set forth in claim 3 and wherein:
   a) said controller including a casing provided with a bottom surface to support said controller when placed on the ground and at least one side surface containing said female connector so that once the controller is positioned on the ground, said self-running car can be remotely driven by said controller and cause engagement of said male connector with said female connector thereby allowing said self-driven car to be recharged.

5. A radio control car is set forth in claim 3 and wherein:
   a) said male connector including a tapered guide surface positioned forward of said detent to assist in aligning said boss with said detent when said male connector is inserted into said female connector.

6. A radio control car is set forth in claim 3 and wherein:
   a) said charged terminal including a concave surface and said charging terminal including a convex surface so that when said charging terminal is engaged with said charged terminal said concave surface receives said convex surface.

7. A radio control car is set forth in claim 3 and wherein:
   a) said charged terminal comprises a pair of positive pole terminals and said charging terminal comprises a pair of negative pole terminals; and
   b) said male connector and said female connector have a polarized configuration to prevent inadvertent pole reversal during connection.

* * * * *